US010453359B2

(12) United States Patent
Kim et al.

(10) Patent No.: US 10,453,359 B2
(45) Date of Patent: Oct. 22, 2019

(54) BRAILLE LEARNING APPARATUS AND BRAILLE LEARNING METHOD USING THE SAME

(71) Applicant: OHFA Tech, Inc., Gumi-si (KR)

(72) Inventors: Hangsok Kim, Goyang-si (KR); Jae Ryun Cho, Anyang-si (KR); Kyounghwang Lee, Yangpyeong-gun (KR); Minsung Son, Seoul (KR)

(73) Assignee: OHFA TECH, Inc., Gumi-si (KR)

( * ) Notice: Subject to any disclaimer, the term of this patent is extended or adjusted under 35 U.S.C. 154(b) by 261 days.

(21) Appl. No.: 15/396,427

(22) Filed: Dec. 31, 2016

(65) Prior Publication Data

US 2017/0309203 A1 Oct. 26, 2017

(30) Foreign Application Priority Data

Apr. 20, 2016 (KR) .................. 10-2016-0048267

(51) Int. Cl.
*G09B 21/00* (2006.01)
*H04M 1/02* (2006.01)
*H04M 1/725* (2006.01)

(52) U.S. Cl.
CPC ........ *G09B 21/004* (2013.01); *G09B 21/006* (2013.01); *H04M 1/0202* (2013.01); *H04M 1/72594* (2013.01)

(58) Field of Classification Search
CPC .................................................. G09B 21/004
USPC ....................................................... 434/113
See application file for complete search history.

*Primary Examiner* — Kesha Frisby

(57) ABSTRACT

A braille learning apparatus includes a plurality of slave blocks for receiving braille from a learner, and a master station configured to: receive braille learning information from an external braille learning information terminal, when slave blocks corresponding to a specific braille inputted by the learner are mounted, determine whether the specific braille inputted to the slave blocks match a learning word, and transmit a determination result to the external braille learning information terminal.

10 Claims, 14 Drawing Sheets

BRAILLE LEARNING APPARATUS AND BRAILLE LEARNING METHOD USING THE SAME

CROSS REFERENCE TO RELATED APPLICATIONS

This application claims priority of Korean Patent Application No. 10-2016-0048267, filed on Apr. 20, 2016, the entire contents of which are incorporated herein by reference.

TECHNICAL FIELD

The present disclosure generally relates to a braille learning apparatus and a braille learning method using thereof. More specifically, the present disclosure relates to a braille learning apparatus capable of enabling a learner wishing to learn braille to actively learn to read and write braille characters, and a braille learning method using the same.

TECHNICAL BACKGROUND OF THE INVENTION

Generally, braille for the visually impaired can express the initials, the vowels, the consonants, the predefined abbreviations and numbers using six braille dots. Thus, braille is an important means of acquiring information for a visually impaired person. It is the only letters that a visually impaired person can read and write on his/her own, and enables knowledge education of the visually impaired. Therefore, braille is called "Hun-Maeng-Jeong-Eum" (meaning letters for visually impaired in Korean) as compared to "Hum-Min-Jeong-Eum" (meaning letters in Korean). Meanwhile, while braille books and braille publications for the visually impaired are provided to increase the convenience of the visually impaired in places such as the library dedicated to the visually impaired, braille books and braille publications for the visually impaired are remarkably few in number because of the extra expense and effort in the production process, unlike regular books. In particular, since there are not enough braille textbooks for braille education compared to the number of visually impaired people, a considerable number of visually impaired people can not receive braille education.

In addition, conventional braille books and publications are limited only to the use of the tactile indication by the visually impaired persons, and because the visually impaired person must use tools such as a stapler and a pencil for writing braille, there were many difficulties for the visually impaired to learn braille characters through writing braille characters by themselves.

DISCLOSURE OF THE INVENTION

The invention has been made in view of the above problems, and it is an object of the present invention to provide a braille learning apparatus and a braille learning method using the braille learning apparatus.

Further, the purpose of the present invention is to provide a braille learning device and a braille learning method, with which, when an educator who instructs braille learning inputs a learning word using a braille learning information terminal, the learner can read or write the corresponding braille by himself.

The objects of the present invention are not limited to the above-mentioned objects, and other objects not mentioned can be clearly understood by those skilled in the art from the following description.

Means for Solving the Problems

According to one aspect, there is provided a braille learning apparatus which includes: a plurality of slave blocks for receiving braille from a learner; and a master station configured to: receive braille learning information from an external braille learning information terminal, when slave blocks corresponding to a specific braille inputted by the learner are mounted, determine whether the specific braille inputted to the slave blocks match a learning word, and transmit a determination result to the external braille learning information terminal.

According to another aspect, there is provided a braille learning apparatus, which includes: a plurality of slave blocks for receiving braille from a learner; and a master station configured to: receive braille learning information from an external braille learning information terminal, and when slave blocks corresponding to a specific braille inputted by the learner are mounted, transmit information on the specific braille to the external braille learning information terminal.

In a preferred embodiment, each of the plurality of slave blocks includes: a block body having a plurality of through holes provided on a front surface and a rear surface thereof, which are opposite each other; and a plurality of braille input pins accommodated in the block body, each of the plurality of braille input pins being configured to be pressed through an external force of the learner, wherein one end of each of the plurality of braille pins protrudes via a through hole at the front surface of the block body when the braille is not inputted, and another end of each of the plurality of braille pins protrudes via a through hole at the rear surface of the block body when the braille is inputted.

In a preferred embodiment, each of the plurality of slave blocks further includes: a braille input pin fixing member for fixing the braille input state or an uninput state so as not to change until the external force of the learner is applied to each of the braille input pins.

In a preferred embodiment, the braille input pin fixing member includes: a permanent magnet fixedly coupled to a predetermined position of the braille input pin; and a pair of magnetic bodies spaced apart from each other by a predetermined distance so that the permanent magnet can move inside the block body.

In a preferred embodiment, the master station includes: a block mount unit for providing a predetermined space in which the slave blocks are mounted; and a sensing unit which is turned on by pressing a braille input pin protruding from a rear surface of each of the slave blocks when the slave blocks are mounted on the block mounting unit.

In a preferred embodiment, the master station further includes a block fixing unit for applying a predetermined attractive force when the slave blocks are mounted in the block mounting unit to firmly fix the slave blocks.

In a preferred embodiment, the master station further includes: a communication unit for communicating with the braille learning information terminal and receiving the braille learning information; and a controller for checking the braille inputted to the slave blocks based on whether the sensing unit is turned on and controlling the driving of the master station.

In a preferred embodiment, the communication unit transmits the braille inputted to the slave blocks to the braille learning information terminal under the control of the control unit, or compares the braille inputted to the slave blocks with the learning word corresponding to the braille learning information by the control unit, and transmits a determination result based on the comparison to the braille learning information terminal.

In a preferred embodiment, the master station further includes an acoustic output unit for outputting a learning word corresponding to the braille learning information to a sound.

In a preferred embodiment, the master station further comprises a braille actuator for indicating the learning word corresponding to the braille learning information in braille.

In a preferred embodiment, the braille actuator includes: an electromagnet provided on a lower surface and whose polarity changes according to a current flow; a rotary member having an inclied upper surface, a permanent magnet provided on a lower surface thereof, and rotated by an attractive force or a repulsive force acting on the electromagnet; and a braille protrusion formed as an inclined surface such that the bottom surface thereof contacts the inclined surface of the rotary member, and is raised or lowered along the inclined surface of the rotary member when the rotary member is rotated.

According to another aspect, there is provided a braille learning method performed by a braille learning apparatus, including: (1) receiving, by the master station, braille learning information from an external braille learning information terminal; (2) converting, by the master station, the learning word corresponding to the braille learning information into braille and indicates the braille; and (3) transmitting, by the master station, a signal informing completion of learning to the braille learning information terminal after receiving from the learner whether or not the completion of the learning of the indicated braille has been completed.

According to another aspect, there is provided a braille learning method performed by a braille learning apparatus, including: (1) dislodging, by a master station, a plurality of slave blocks and receiving braille learning information from an external braille learning information terminal; (2) outputting, by the master station, a learning word corresponding to the braille learning information by sound; (3) when the braille is inputted to the slave blocks by the learner and the slave blocks are mounted to the master station, sensing the braille inputted to the slave blocks by the master station; (4) determining, by the master station, whether or not the braille inputted to the slave blocks matches the learning word; and (5) transmitting, by the master station, a determination result to the braille learning information terminal According to another aspect, there is provided a braille learning method performed by a braille learning apparatus, including: (1) dislodging, by a master station, a plurality of slave blocks and receiving braille learning information from an external braille learning information terminal; (2) outputting, by the master station, a learning word corresponding to the braille learning information by sound; (3) when the braille is inputted to the slave blocks by the learner and the slave blocks are mounted to the master station, sensing the braille inputted to the slave blocks by the master station; and (4) transmitting, by the master station, the braille inputted to the slave blocks to the braille learning information terminal Advantageous Effect According to the above-mentioned problem solving means, according to the present disclosure, there is provided which includes: a plurality of slave blocks for receiving braille from a learner; and a master station configured to: receive braille learning information from an external braille learning information terminal, when slave blocks corresponding to a specific braille inputted by the learner are mounted, determine whether the specific braille inputted to the slave blocks match a learning word, and transmit a determination result to the external braille learning information terminal. Accordingly, when the educator who instructs the braille learning inputs the learning word using the braille learning information terminal, the learner can directly write the corresponding braille so that the learning efficiency of the braille can be improved.

Further, the present aspects of the invention can indicate the learning words of the braille learning information received from the braille learning information terminal in braille, so that the learner can directly read various words and sentences without having additional braille books and teaching materials Thereby, the learning efficiency of the braille can be further improved.

The present disclosure also relates to an electromagnet which is installed on the lower surface and whose polarity changes according to the current flow, a rotary member which is formed with an inclined surface on its upper surface and a permanent magnet on its lower surface, And a braille protrusion which is formed as an inclined surface such that its lower surface is in contact with the inclined surface of the rotary member and which is raised or lowered along the inclined surface of the rotary member when the rotary member is rotated, Even when the upper surface of the rotating rotary member rotates the rotary member by the permanent magnet and the repulsive force or attraction and the upper surface of the rotating rotary member lifts the lower surface of the braille projection to output the braille and then stops the current supply to the electromagnet, it is possible to maintain the output state and thus to reduce the power consumed by the braille output remarkably.

DETAILED DESCRIPTION OF THE INVENTION

Although specific details of the present invention are set forth in the following description to provide a more thorough understanding of the present invention, it will be obvious to those of ordinary skill in the art that the present invention may be practiced without these specific details.

Hereinafter, preferred embodiments according to the present invention will be described in detail with reference to FIGS. 1 to 13, and a description will be given largely based on the parts necessary for understanding the operation and operation according to the present invention.

Figure 1:
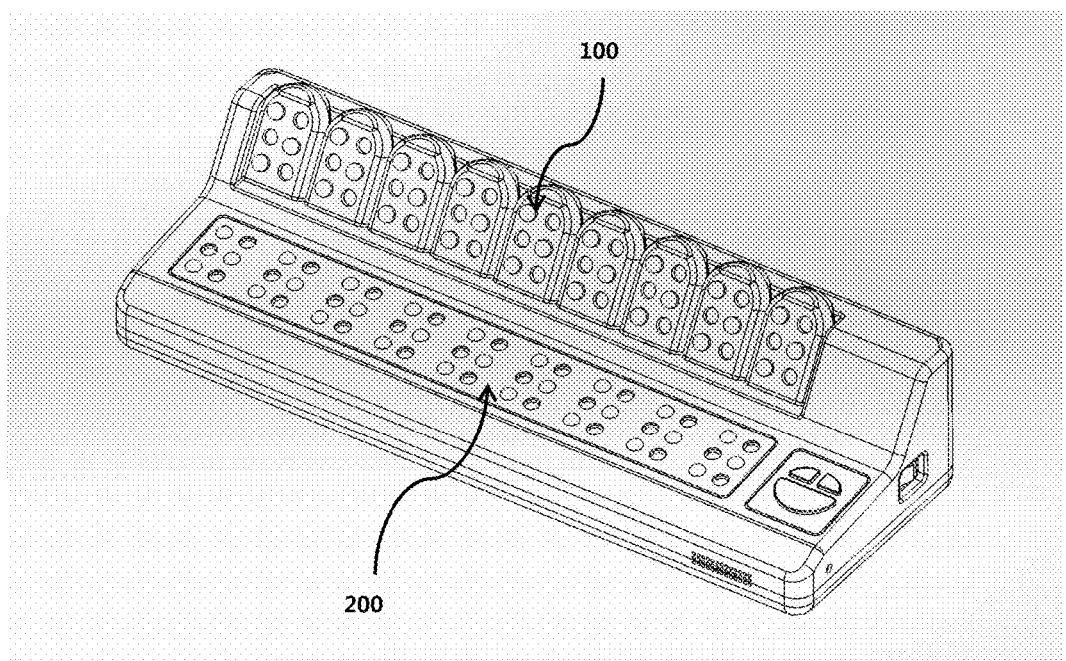
FIG. 1 is a diagram for explaining a braille learning apparatus according to an embodiment of the present invention.

FIG. 1 is a diagram for explaining a braille learning apparatus according to an embodiment of the present invention.

Referring to FIG. 1, the braille learning apparatus according to an embodiment of the present invention includes a plurality of slave blocks 100 and a master station 200.

The plurality of slave blocks 100 allow a learner, such as a visually impaired person, to manually input braille characters such as initials, vowels, consonants, predefined abbreviations and numbers.

Also, since multiple slave blocks 100 are provided, the learner can input braille characters into the plurality of slave blocks 100 to complete various words and sentences.

The master station 200 confirms the braille inputted to the slave blocks 100 from the learner and transmits the information to the braille learning information terminal of the educator who guides the braille learning.

For example, The master station 200 receives the braille learning information from the braille learning information terminal of the educator and recognizes the braille characters inputted to the slave blocks 100 when the slave blocks 100 to which the specific braille characters are inputted have been mounted by the learner to determine whether or not the braille characters match the learning word based on the braille learning information. In addition, the master station 200 transmits the determination result to the braille learning information terminal or transmits the braille inputted to the slave blocks 100 to the braille learning information terminal.

Further, the master station 200 may receive the braille learning information from the braille learning information terminal of the educator who guides braille learning, and indicate the corresponding braille at a predetermined positions so that the learner can read the braille learning information.

Meanwhile, the above-mentioned braille learning information terminal refers to a device that communicates with the master station to transmit braille learning information and performs a function of receiving information such as a determination result from the master station. For example, the braille learning information terminal may be implemented as a braille information instrument capable of inputting by way of a braille keyboard and braille output based on an interface for a visually impaired person or may be implemented as a smart terminal such as a smart phone on which an application program with the aforementioned functionalities is installed and implemented.

Therefore, the braille learning apparatus according to an embodiment of the present invention can be utilized for the purpose of braille education, allowing a learner to directly use various braille characters using the slave blocks 100. The learning efficiency of the braille can be improved compared to the conventional braille text material by allowing the station 200 to read the braille or to check whether the braille inputted to the slave blocks 100 are correct or not.

Hereinafter, the slave blocks 100 and the master station 200 according to an embodiment of the present invention will be described in more detail.

Figure 2:
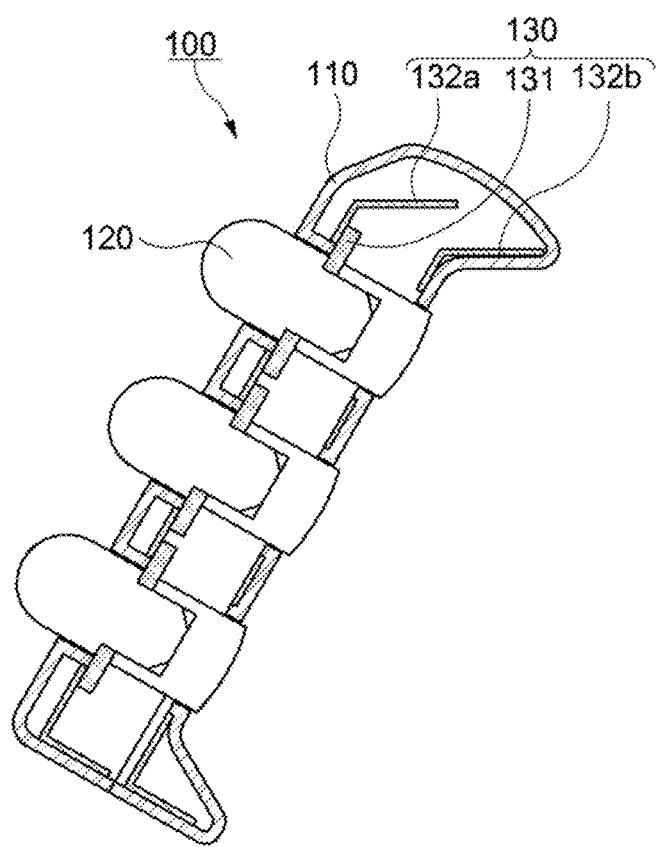
FIG. 2 is a view for explaining an internal structure of a slave block.

FIG. 2 is a diagram for explaining an internal structure of a slave block.

Referring to FIG. 2, a slave block 100 according to an embodiment of the present invention includes a block body 110, a braille input pin 120, and a braille input pin fixing member 130.

The block body 110 forms a predetermined outer appearance, and a plurality of braille input pins 120 and a braille input pin fixing member 130 are accommodated in the block body 110.

A plurality of through holes opposing each other are formed on the front surface and the rear surface of the block body 110. Each braille input pin 120 protrudes through the through hole to allow the learner to apply an external force. In the embodiment, the braille input pins 120 are provided in six, and two braille input pins 120 are arranged in the horizontal direction and three braille input pins 120 are arranged in the vertical direction.

Furthermore, one end of the braille input pin 120 protrudes into the through hole on the front surface of the block body 110 when the braille is not inputted. Also, when the braille is inputted, the other end of the braille input pin 120 protrudes into the through hole on the rear surface of the block body 110.

That is, when a learner applies an external force to a specific braille input pin 120 from the front of the block body 110 to input braille, the braille input pin 120 moves by the external force to protrude into the rear surface of the block body 110. On the contrary, at the time of initializing the braille inputted to the slave block 100, an external force is applied to the braille input pins 120 protruding from the rear surface of the block body 110 so that all the braille input pins 120 may protrude from the front surface of the block body 110.

Also, the braille input pins 120 are fixedly supported by the braille input pin fixing member 130. For example, the braille input pin fixing member 130 can fix the braille input state or the braille non-input state until an external input of the learner is applied to each braille input pin 120.

To achieve this, the braille input pin fixing member 130 may include a permanent magnet 131 fixedly coupled to a predetermined position of the braille input pin 120 and a pair of magnetic bodies 132a and 132b spaced apart from each other with the permanent magnet 131 disposed therebetween. Preferably, each of the magnetic bodies 132a and 132b may be formed of a metal such as iron.

Also, the magnetic bodies 132a and 132b can have a configuration such that the magnetic bodies 132a and 132b are respectively disposed on the inner front surface and the inner rear surface of the block body 110 and the permanent magnet 131 can move only between the magnetic bodies 132a and 132b.

Also, when an external force is applied to the braille input pin 120 from the front surface of the block body 110 to move the braille input pin 120 to the rear surface of the block body 110, the permanent magnet 131 fixedly coupled to the block body 110 and the magnetic body 132*b* disposed on the rear surface of the block body 110 are brought into contact with each other by attraction.

In contrast, when an external force is applied to the braille input pin 120 from the rear surface of the block body 110, the respective braille input pin 120 moves to the front surface of the block body 110, and the magnetic body 132*a* disposed on the front surface of the block body 110 are brought into contact with the permanent magnet 131 by attraction.

That is, the braille input pin 120 can be fixed by the attractive force between the permanent magnet 131 and one of the magnetic bodies 132*a* and 132*b*.

Also, by forming bent portions bent at predetermined positions of the magnetic bodies 132*a* and 132*b* toward the rear surface of the block body 110, the attraction force of the block fixing unit 250 of the master station 200, which will be described later, may work more effectively. In addition, if the slave block 100 is provided with a recess on the rear surface thereof, the slave block 100 can be mounted more easily when the slave block 100 is mounted on the block mounting unit 230.

Figure 3:
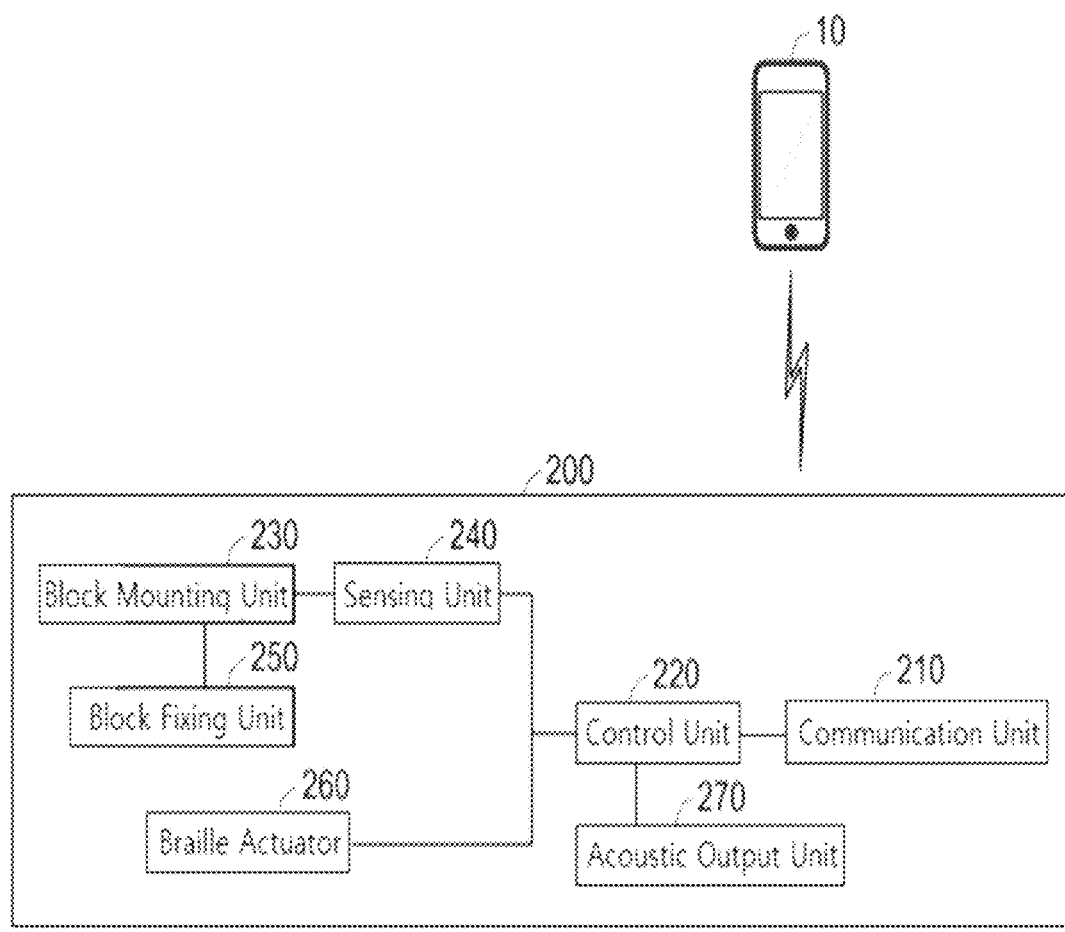
FIG. 3 is a view for explaining a master station.
Figure 4:
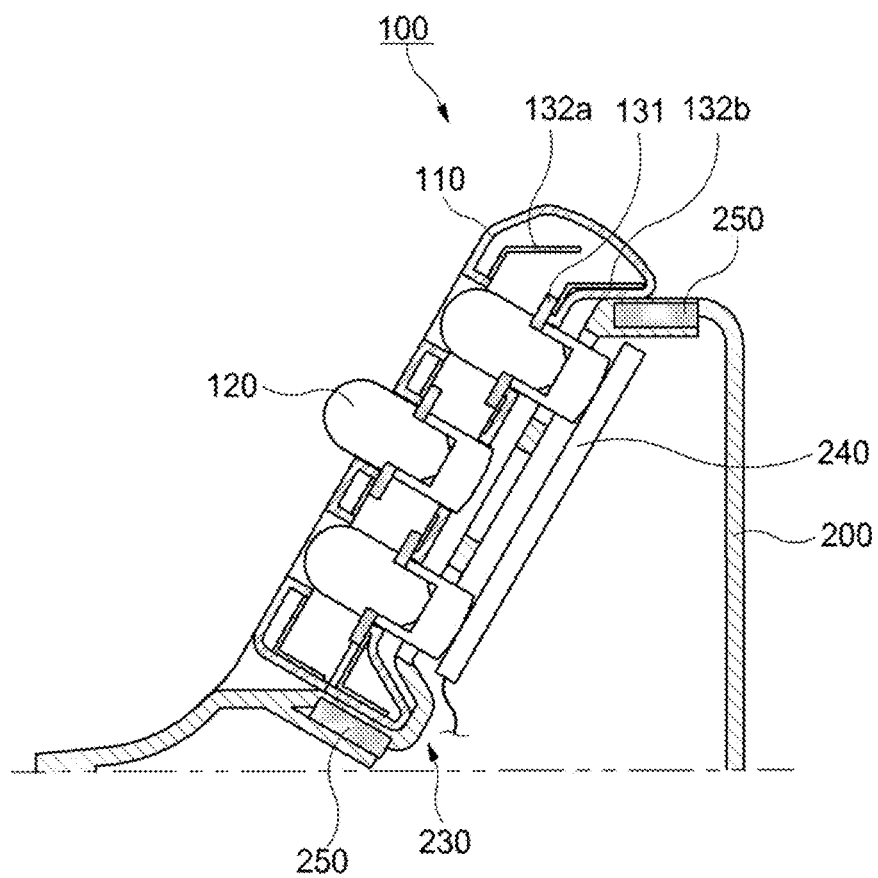
FIG. 4 is a view for explaining a block mounting unit, a sensing unit, and a block fixing unit of the master station.

FIG. 3 is a view for explaining a master station, and FIG. 4 is a view for explaining a block mounting unit, a sensing unit, and a block fixing unit of the master station.

Referring to FIGS. 3 and 4, a master station 200 according to an embodiment of the present invention basically includes a communication unit 210, a control unit 220, a block mounting unit 230, a sensing unit 240, the block fixing unit 250, and a braille actuator 260, and may further include an acoustic output unit 270.

Here, the acoustic output unit 270 may output audio or sound under the control of the control unit 220. The acoustic output unit 270 may be implemented as various types of speakers which convert an electric signal into a sound wave and output it.

The communication unit 210 is for communicating with the external braille learning information terminal 10. The communication unit 210 receives the braille learning information from the braille learning information terminal 10 and, under the control of the control unit 220 (to be described later), transmits various information related to the braille inputted to the slave blocks 100 to the braille learning information terminal 10.

In addition, the communication unit 210 may include various communication modules capable of transmitting and receiving predetermined information to and from the braille learning information terminal 10, and may be a W-Fi module or a Bluetooth module.

The control unit 220 controls the overall operation of the master station 200. In particular, the control unit 220 controls the braille actuator (to be described later) according to the learning information received by the communication unit 210 to output braille, output a sound through the acoustic output unit 270, or check the braille inputted from the learner to the slave blocks 100.

For example, when the communication unit 210 receives the braille learning information transmitted by the educator using the braille learning information terminal 10, the control unit 220 can control the acoustic output unit 270 to output the learning word corresponding to the braille learning information as a sound through the acoustic output unit 270, implemented by a speaker.

Also, the control unit 220 performs a function of checking the braille inputted to the slave blocks 100 according to whether the sensing unit 240 is turned on or not. The control unit 220 may also compare the braille inputted to the slave blocks 100 and the learning word according to the braille learning information to decide whether they match each other.

At this time, the determination result of the control unit 220 is transmitted to the braille learning information terminal 10 through the communication unit 210. Meanwhile, the control unit 220 may transmit the braille information itself inputted to the slave blocks 100 to the braille learning information terminal 10 through the communication unit 210.

In addition, the control unit 220 may control the braille actuator 260 (to be described later) to indicate braille corresponding to the braille learning information.

The block mounting unit 230 is provided at a predetermined position on the master station 200 to provide a predetermined space on which the slave blocks 100 are mounted. In addition, the learner may listen to the learning word, input braille to the slave blocks 100, and then mount the slave blocks 100 on the block mounting unit 230.

Meanwhile, the block mounting unit 230 may have a structure corresponding to the shape of the rear surface of the slave block 100. The block mounting unit 230 may be provided with the through holes into which the braille input pins 120 protruding from the rear surface of the slave blocks 100 are inserted.

The sensing unit 240 senses the braille inputted to each slave block 100. The sensing unit 240 may be disposed inside the block mounting unit 230. The sensing unit 240 may be implemented by a plurality of switches each being pressed to be turned on by the braille input pin 120 protruding toward the rear surface of the slave block 100.

Preferably, the sensing unit 240 may be a membrane switch, and may be electrically connected to the controller 220 through a connector or the like.

Accordingly, when the learner listens to the learning word and inputs the braille to the slave blocks 100 and then places the braille on the block mounting unit 230, only the switches pressed by the braille input pins 120 of the block 100 are turned on among the plurality of switches constituting the sensing unit 240. The control unit 220 may identify the positions where the turn-on signals are generated in the sensing unit 240 and recognizes the braille.

The block fixing unit 250 fixes the slave blocks 100 by applying a predetermined attractive force when the slave blocks 100 are mounted on the block mounting unit 230. The block fixing unit 250 may be implemented by a magnet disposed at a predetermined position of the block mounting unit 230.

Therefore, the slave block 100 may be in contact with and fixed to the block fixing unit 250 by the attractive force between the magnetic bodies 132*a* and 132*b* provided inside the slave block 100 and the block fixing unit 250.

The braille actuator 260 is provided inside the master station 200 and operates under the control of the control unit 220 to indicate braille so as to indicate a braille word corresponding to the braille learning information by externally projecting the protrusions to indicate braille so that the learner can read the braille corresponding to the braille learning information.

The braille actuator 260 may be implemented by various types of actuators capable of projecting protrusions for indicating braille using a mechanical driving force or a magnetic force.

For example, the braille actuator 260 may be implemented as a solenoid-type actuator which includes a permanent magnet at a predetermined position of the protrusion, or may include a permanent magnet as the protrusion itself, and an electromagnet may be installed on the upper surface or the lower surface of the braille actuator 260 so as to raise the protrusion by attraction or repulsion between the electromagnet with the current being supplied thereto and the permanent magnet. On the other hand, permanent magnets may be provided on the upper surface or the lower surface of the braille actuator 260, and electromagnets may be provided at predetermined positions of the protrusions.

As another example, the braille actuator 260 may be implemented as a piezoelectric-type actuator which is equipped with a projection for indicating braille as a piezoelectric body, the length of which changes according to the voltage applied to the piezoelectric body so as to allow recognition of braille by the changed length of the piezoelectric body.

As another example, the braille actuator 260 may be implemented as a polymer dielectric type actuator which compresses the polymer dielectric layer in the thickness direction by an attractive force generated by applying electrodes to both surfaces of a polymer material having a high dielectric constant such as silicon or urethane and applying a voltage thereto so as to project the protrusion outside to indicate the braille.

However, since the actuators of the above-described type must continuously be supplied with current or voltage to maintain the projecting state of the protrusions for indicating braille, power consumption may be excessively caused.

Therefore, the braille actuator 260 according to the embodiment of the present invention is implemented to be easily applicable to various portable electronic devices operating with limited battery power by minimizing power consumption.

Hereinafter, the braille actuator 260 according to an embodiment of the present invention will be described in more detail.

Figure 5A:
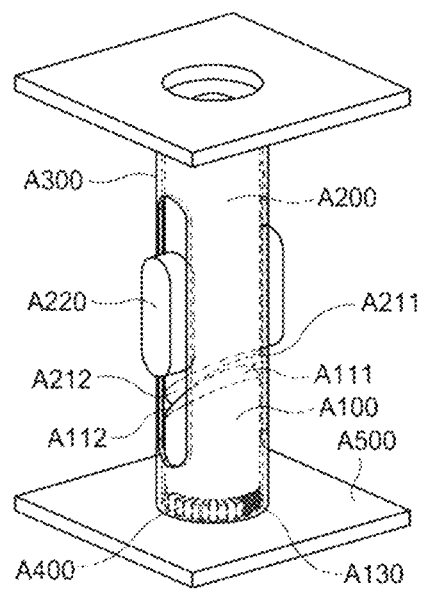
FIGS. 5A and 5B are diagrams showing an overall configuration of a braille actuator.
Figure 5B:
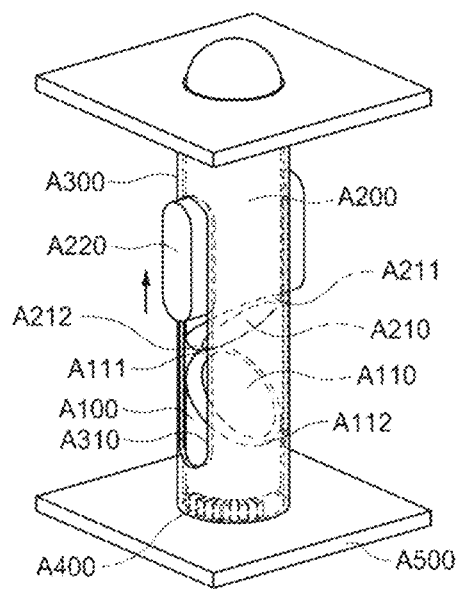

FIGS. 5A and 5B are diagrams showing an overall configuration of a braille actuator according to an embodiment of the invention.

Referring to FIGS. 5A and 5B, the braille actuator 260 of the present invention operates under the control of the controller 220 to indicate a braille word corresponding to the braille learning information. The braille actuator 260 may basically include electromagnets A400, a rotary member A100, and a braille projection A200. The braille actuator 260 may further include a housing A300.

First, the electromagnets A400 are fixedly installed on the floor A500 of the braille actuator, and the polarity thereof is changed in accordance with the direction of the incoming current. The electromagnets A400 may be realized by typical electromagnets A400 having a magnetic core such as an iron core around which a coil is wound.

The rotary member A100 may be formed such that the upper surface A110 thereof is formed as an inclined surface and a permanent magnet A130 is provided on the lower surface A120 so that an attractive or dispulsive force to the permanent magnet A130 installed on the lower surface is exerted to rotate the permanent magnet A130 clockwise or counterclockwise, thereby raising or lowering the braille projection A200. The configuration of the rotary member A100 will be described in more detail with reference to FIG. 6AA to FIG. 6BB.

The braille projection A200 is formed to have an inclined surface so that the lower surface A210 is in contact with the inclined surface of the rotary member A100. When the rotary member A100 rotates, the braille projection A200 rises or falls along the inclined surface of the rotary member A100. The inclination angle formed by the inclined surface of the braille projection A200 is formed to be equal to the inclination angle formed by the inclined surface of the rotary member A100 so that the inclined surface of the rotary member A100 is in surface contact with the inclined surface of the braille projection A200. However, it is not necessary that the both inclined surfaces are completely in close contact with each other.

The side surface of the braille projection A200 is provided with a guide A220 for preventing the braille projection A200 from rotating together with the rotary member A100 while allowing the braille projection A200 to perform only up and down movement, respectively.

The braille actuator of the present invention may further include a housing A300 for accommodating the braille projection A200 and the rotary member A100 therein. As shown in FIG. 5B, a guide groove A310 to which the guide A220 is coupled is formed in the longitudinal direction at a position corresponding to the guide A220 formed on the side surface of the braille projection A200.

Referring to FIGS. 5A and 5B, the operation of the braille actuator of the present invention will be described. First, in a state in which the braille is not projected (see FIG. 5A), the inclined surface, which is the lower surface A210 of the braille projection A200, abuts against the inclined surface of the lower surface A210 of the braille projection A200. In the state where the braille is not projected, the electric current is not supplied to the electromagnets A400. In this state, the highest point A111 of the upper surface A110 of the rotary member A100 may be in contact with the highest point A211 of the lower surface A210 of the braille projection A200, and the lowest point A112 of the upper surface A110 of the rotary member A100 may be in contact with the lowest point of the lower surface A210 of the braille projection A200. At a minimum, the highest point A111 of the upper surface A110 of the rotary member A100 and the highest point A211 of the lower surface A210 of the braille projection A200 lie in a line, and the lowest point A112 of the upper surface A110 of the rotary member A100 and the lowest point of the lower surface A210 of the braille projection A200 lie in a line.

Thereafter, when the braille projection A200 is to be projected, a current is supplied to the electromagnets A400 which are fixed on the floor A500, and an attractive force or a repulsive force acts between the permanent magnet A100, which is provided on the lower surface A120 of the rotary member A100, and the electromagnets A400, to rotate the rotary member A100 by 180 degrees.

When the rotary member A100 is rotated, the direction of the inclined surface formed on the upper surface A110 is rotated 180 degrees. In this process, as shown in FIG. 5B, the upper surface A110 of the rotary member A100 and the lower surface A210 of the braille projection A200 are dislocated from each other so that the inclined surface A110 of the rotary member A100 raises the inclined surface A210 of the braille projection A200 so that the braille projection A200 protrudes outwardly. In the state where the braille projection A200 protrudes, the highest point A111 of the upper surface A110 of the rotary member A100 abuts on the lowest point A212 of the lower surface A210 of the braille projection A200 or is disposed on a straight line. Also, the lowest point A112 of the upper surface A110 of the rotary member A100 is disposed on a straight line with the highest point A211 of the lower surface A210 of the braille projection A200.

When the rotation is completed, the supply of the electric current to the electromagnets A400 is cut off. Even when the current supply is cut off, the rotary member A100 maintains its current state due to the surplus magnetic force remaining in the electromagnets A400 and the frictional force with the floor A500, and the braille projection A200 also maintains its projecting state by the rotary member A100. In addition, even if the user presses the braille projection A200 from the top to the bottom, the applied pressure is transmitted in the vertical direction, so that the projected state is maintained by the rotary member A100 which holds the fixed state.

On the other hand, in order to return the protruded braille projection A200 to the original state as shown in FIG. 5A again (in order to insert the braille projection inside the housing), a current with an opposite polarity from the one applied when projecting the braille protrusion A200 is applied to the electromagnets A400. Then, the rotary member A100 rotates in a direction opposite to the direction in which the braille projection A200 is projected, and the projected braille projection A200 also falls and returns to the original state as shown in FIG. 5A.

Thus, according to the present invention, current is supplied only when the state of the braille projection A200 is changed, that is, when the braille projection A200 is projected or when the projected braille projection A200 retreats inside, but current is not supplied so long as the state is maintained. Thus, power consumption can be remarkably reduced as compared with the conventional methodologies.

Meanwhile, according to the preferred embodiment of the present invention, the edge of the upper surface A110 of the braille projection A200 and the edge of the lower surface A210 of the braille projection A200 may be rounded so that the braille projection A200 can be smoothly raised while minimizing the frictional force with the braille projection A200 when the rotary member A100 rotates.

Figure 6A:
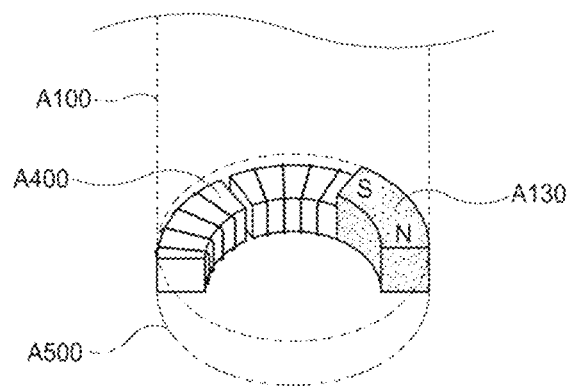
FIGS. 6AA to 6AC are views showing a structure of an electromagnet fixed on a lower surface and a permanent magnet installed on a rotary member according to a first preferred embodiment of the present invention.
Figure 6A:
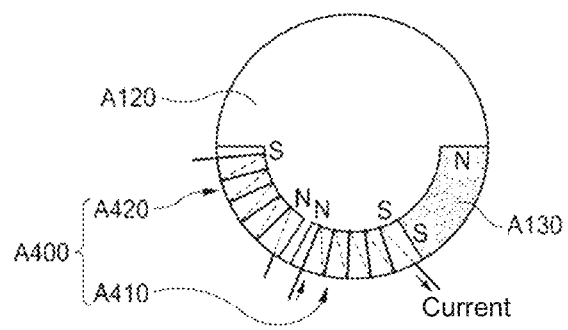
Figure 6A:
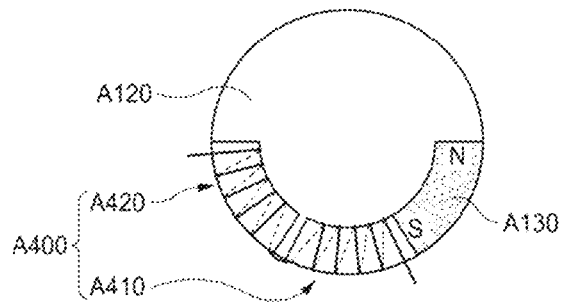

FIGS. 6AA and 6AB are diagrams showing structures of electromagnets A400 fixed on the floor A500 and a permanent magnet A130 installed on a rotary member A100 according to first and second preferred embodiments of the present invention.

First, the first preferred embodiment of the present invention will be described with reference to FIG. 6AA. Referring to FIG. 6AA, the braille projection A200 and the rotary member A100 of the present invention are both formed in a cylindrical shape, and the electromagnets A400 and the permanent magnet A130 are arranged in a cylindrical shape along a circumferential length of the cross section of the rotary member A100. The sum of the circumferential lengths occupied by the electromagnets A400 and the permanent magnet A130 is about 50% of the circumferential length of the rotary member A100. Therefore, the rotary member A100 can rotate by 180 degrees.

The electromagnets A400 of the present invention may comprise two electromagnets A400 (the first electromagnet A410 and the second electromagnet A420) as shown in FIGS. 6AB and 6AC. The first electromagnet A410 is in contact with the permanent magnet A130 in a state in which the braille projection A200 is accommodated inside and is in surface contact with the rotary member A100 as in the state shown in FIG. 5A. The second electromagnet A420 comes into contact with the permanent magnet A130 in a state where the braille projection A200 protrudes, as shown in FIG. 5B.

As shown in FIG. 6AB, the first electromagnet A410 and the second electromagnet A420 are provided with a magnetic core and electric wires wound around the magnetic core, respectively, so that, by controlling the direction of the supplied current to the electromagnets A400, they may be driven so that the directions of the magnetic lines of force are opposite to each other (that is, the opposite poles have the same polarity).

As shown in FIG. 6AC, it is possible that only the magnetic cores of the first electromagnet A410 and the second electromagnet A420 are separated from each other, and the electric wires wound around the magnetic cores are common such that only the directions of the magnetic lines of force are opposite to each other.

Hereinafter, an exemplary embodiment implemented using the first electromagnet A410 and the second electromagnet A420 shown in FIG. 6AC will be described. Those skilled in the art will appreciate that the example shown in FIG. 6AB is similar to the example shown in FIG. 6AC, except that the polarity is controlled by controlling the direction of the current respectively supplied to the first electromagnet A410 and the second electromagnet A420 but is driven using the electromagnets A400.

Hereinafter, the second embodiment will be explained with respect to FIGS. 6BA and 6BB. Both the braille projection A200 and the rotary member A100 are formed in a cylindrical shape, and the permanent magnet A130 may be formed so that the N-pole and the S-pole may be formed or installed on the entire lower surface of the rotary member A100 so as to be alternately arranged in a direction perpendicular to the lower surface of the rotary member A100.

Figure 6B:
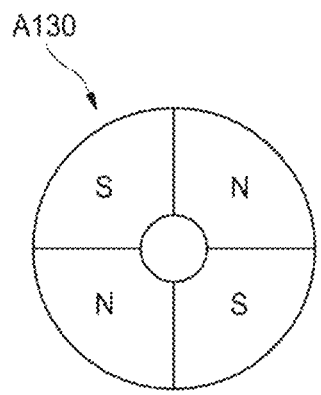
FIGS. 6BA and 6BB are views showing a structure of an electromagnet fixed on a floor surface and a permanent magnet installed on a rotary member according to a second preferred embodiment of the present invention.
Figure 6B:
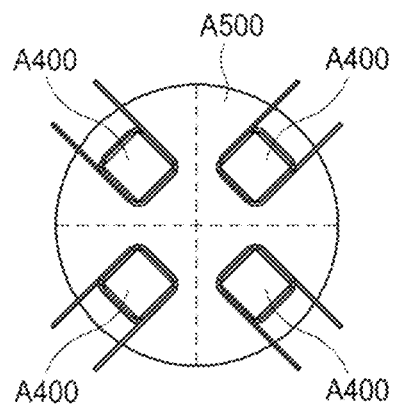
Figure 6B:
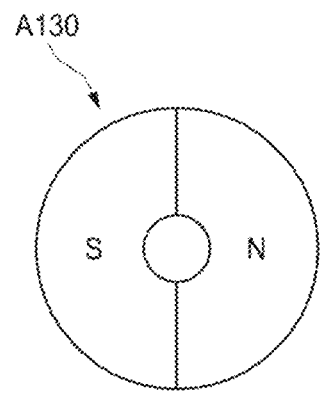
Figure 6B:
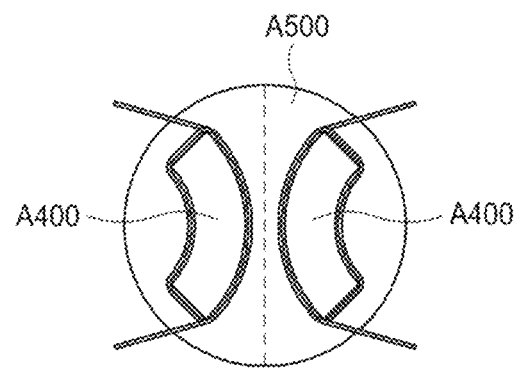

In the example shown in FIG. 6BA, four permanent magnets A130 are formed or installed on the lower surface of the rotary member A100 so that the polarities thereof are alternately arranged. The floor A500, which is in contact with the permanent magnet A130, also has four electromagnets A130 fixed so as to correspond to the polarity of the permanent magnet A130.

Also, In the example shown in FIG. 6BB, two permanent magnets A130 are formed or provided on the lower surface of the rotary member A100 so that polarities different from each other are arranged. The floor A500, which is in contact with the permanent magnet A130, also has two magnet pieces A130 fixed so as to correspond to the polarity of the permanent magnet A130 in the contacted floor A500.

FIGS. 7A to 7D are views for explaining a manner in which the rotary member A100 of the present invention rotates according to a preferred embodiment of the present invention. Hereinafter, a method of rotating the rotary member A100 of the present invention will be described with reference to the first embodiment shown in FIGS. 6AA to 6AC.

Figure 7A:
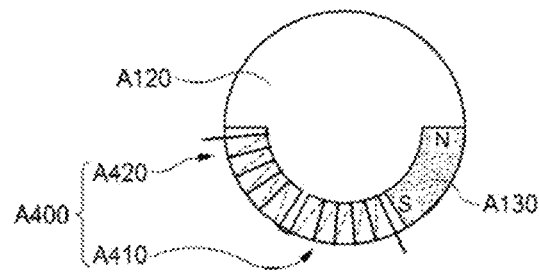
FIGS. 7A to 7D are diagrams illustrating a manner in which the rotary member of the present invention rotates according to a preferred embodiment of the present invention.

Referring to FIGS. 7A to 7D, in the state shown in FIG. 5A, no electric current is supplied to any of the electromagnets A400 as shown in FIG. 7A, so that the electromagnets A400 do not have any polarity. Also, the permanent magnet A130 provided on the rotary member A100 is in contact with the first electromagnet A410.

At this time, as shown in FIG. 5B, in order to raise the braille projection A200 to project outwardly by rotating the rotary member A100 by 180 degrees, current should be supplied so that a repulsive force is applied to the contact surface of the first electromagnet A410 with the permanent magnet A130 whereas the surface of the second electromagnet A420 opposite to the contact surface of the first electromagnet A410 has the same polarity with the contact surface of the first electromagnet A410 to thereby attract the permanent magnet A130.

Figure 7B:
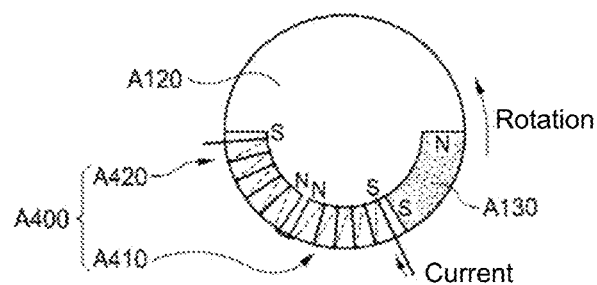

Referring to FIG. 7B, since the polarity of the permanent magnet A130 in contact with the contact surface of the first electromagnet A410 is the S-polarity, current is supplied so that the S-polarity is formed on the contact surface of the first electromagnet A410 to act a repulsive force between the first electromagnet A410 and the permanent magnet A130, and the rotary member A100 starts to rotate in the direction indicated by the arrow.

Figure 7C:
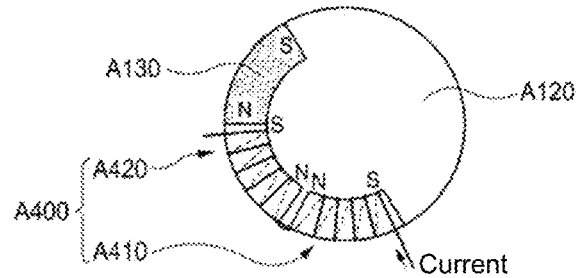

The rotating permanent magnet A130 is attracted by the attracting force between the S-pole of the second electromagnet A420 and the N-pole of the permanent magnet A130 so that the N-pole of the permanent magnet A130 is attracted to the second electromagnet A420, and the rotary member A100 rotates by 180 degrees (see FIG. 7C).

Figure 7D:
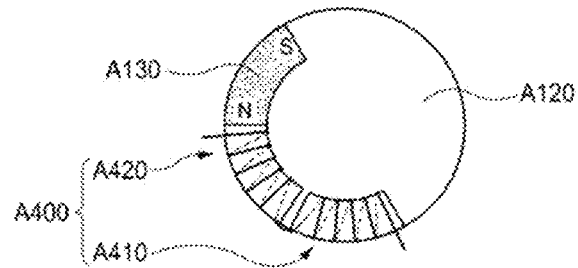

Finally, when the permanent magnet A130 comes in contact with the second electromagnet A420, that is, when the braille projection A200 rises and protrudes outwardly, the current supplied to the electromagnets A400 is cut off, and the projecting state of the projection A200 is maintained and held by the rotary member A100 (see FIG. 7D).

On the other hand, in case when the electric wires are individually wound around the first electromagnet A410 and the second electromagnet A420, respectively, instead of being shared and the polarity is controlled individually, an electric current is supplied so that the S-polarity is formed on the contact surface of the first electromagnet A410 that contacts the S-pole of the permanent magnet A130 and another S-polarity is formed on the opposite surface of the second electromagnet A420 while the braille projection A200 is accommodated inside, the rotary member A100 is rotated in the manner as shown in FIG. 3.

Meanwhile, if the driving circuit for the actuator of the present invention is capable of controlling the current supply in several milliseconds, the operation can be achieved with a single electromagnet A400. Specifically, if a single electromagnet A400 having a combined length of the first electromagnet A410 and the second electromagnet A420 is provided in the embodiment shown in FIG. 7A, a current pulse is instantly applied so that an S-polarity is formed on the contact surface of the electromagnet A400 with the S-pole of the permanent magnet A130. In this case, it is preferable that the magnitude of the current pulse applied at this time is larger than the magnitude of the current shown in FIGS. 7A to 7D.

When the S-polarity is instantaneously formed on the contact surface of the electromagnet A400, the permanent magnet A130 starts to rotate by the repulsive force, and even if the duty cycle of the pulse is ended and the polarity formed on the electromagnet A400 has disappeared, the permanent magnet A130 continues to rotate by inertia. When the permanent magnet A130 moves beyond 50% of the entire circumferential length to which the permanent magnet A130 is supposed to move, the current is supplied in the direction opposite to that previously supplied so that the S-pole acts on the opposite surface of the electromagnet A400 at the moment. Then, the attraction force acts between the N-pole of the permanent magnet A130 and the S-pole formed on the opposite side of the electromagnet A400 so that the N-pole of the permanent magnet A130 contacts with the opposite surface of the electromagnet A400. The permanent magnet A130 is thus rotated by 180 degrees, and the braille projection A200 protrudes outwardly. In this example, the magnitude and width of the current pulse initially applied and the time difference for supplying the current in the direction different from the applied current pulse are calculated in advance in consideration of the weight, material, etc. of the rotary member A100.

Meanwhile, the second embodiment shown in FIG. 6B is different from the first embodiment only in the arrangement of the electromagnet A400 and the permanent magnet A130, and the technical idea of rotating the permanent magnet is the same. Therefore, detailed descriptions will be omitted.

Figure 8:
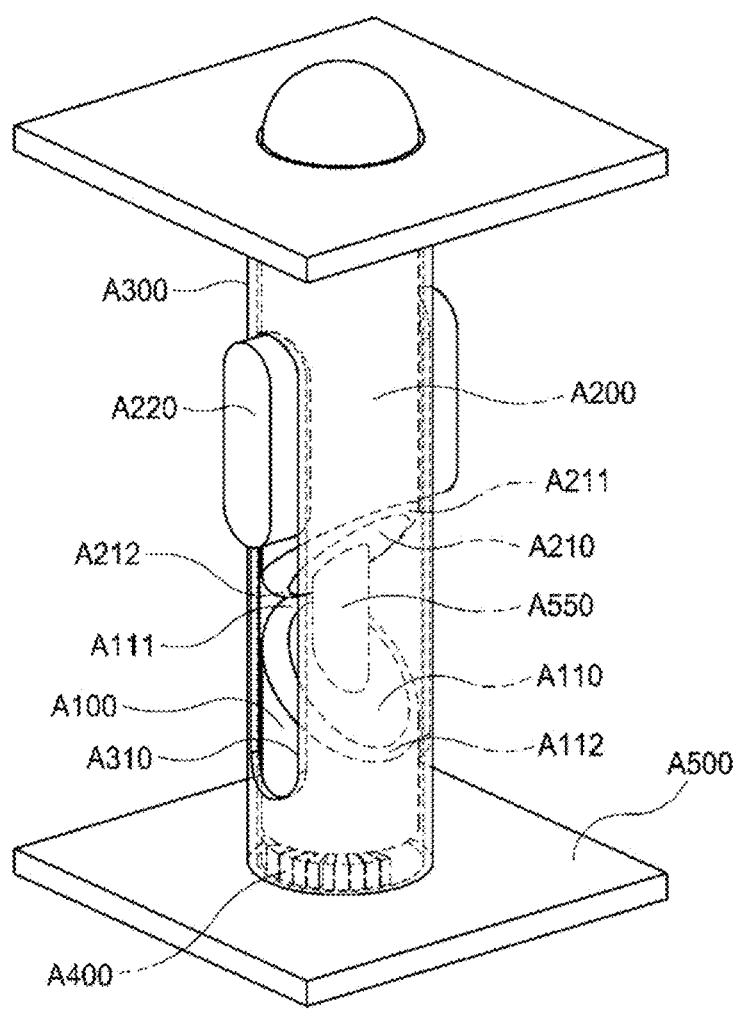
FIG. 8 is a view showing the structure of a braille actuator according to another embodiment of the present invention.

Meanwhile, according to the preferred embodiment shown in FIG. 8, the rotary member A100 and the braille projection A200 may additionally have a center shaft A550 which is formed vertically from the floor A500 and perpetrates the center of the rotary member A100 and the braille projection A200. The center shaft A550 is provided to minimize the frictional force caused by the contact of the rotary member A100 with the side surface of the housing A300 while the rotary member A100 is rotating and the frictional force caused by the contact of the braille projection A200 with the side surface of the housing A300 while the braille projection A100 is moving in association with the rotation of the rotary member A100. At this time, a lubricant may be preferably applied to the central shaft A550 so as to minimize the frictional force between the central shaft A550 and the rotary member A100 and the braille projection A200.

Figure 9:
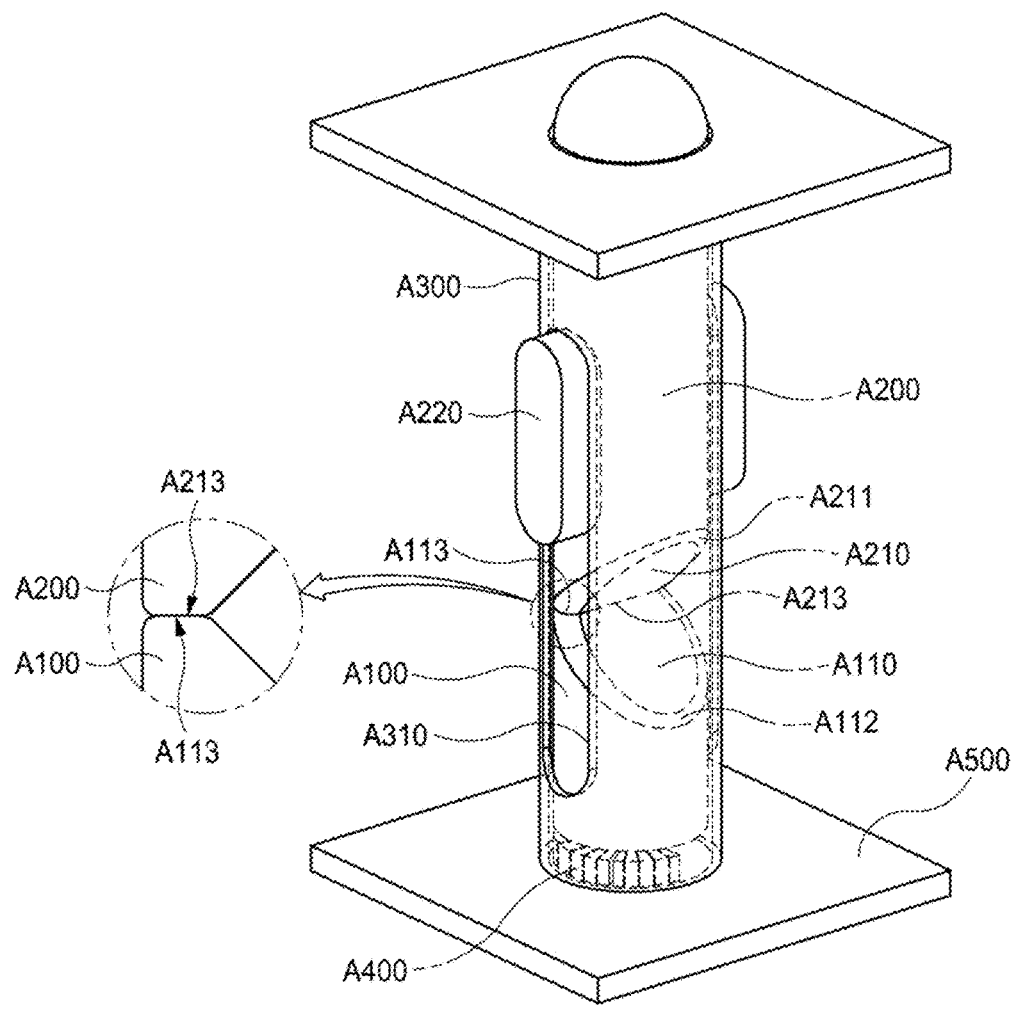
FIG. 9 is a view showing a structure of a braille actuator according to another embodiment of the present invention.

Meanwhile, according to the preferred embodiment shown in FIG. 9, the rotary member A100 and the braille projection A200 may have, at its highest point A111 of the upper surface A110 and at its lowest point A212 of the lower surface A210, respectively, cut surfaces A113, A213 which are horizontally plane.

As shown in FIG. 9, the cut surfaces A113 and A213 are formed horizontally at the highest point A111 of the upper surface A110 of the rotary member A100 and the lowest point A212 of the lower surface A210 of the braille projection A200, which may cause frictional force between the two cut surfaces A113 and A213. Therefore, even when the user slightly touches the braille projection A200 and the braille projection A200 slightly rotates, the braille protrusion A200 is supported by the cut surfaces A113 and 213 so as to prevent the braille projection A200 from falling down along the inclined surface. However, in this case, the strength of the electromagnet A400 should be made stronger than the case where no cut surfaces are provided, considering the frictional force of the cut surface.

Figure 10:
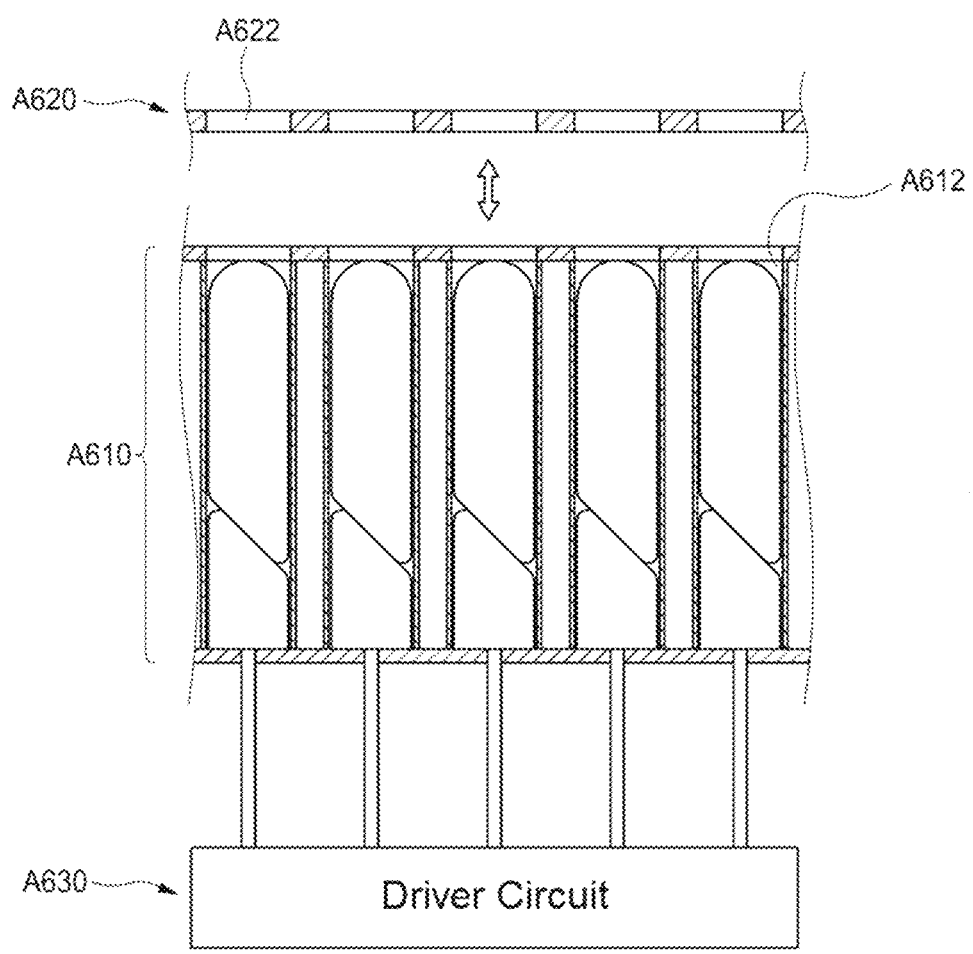
FIG. 10 is a view for explaining an installation environment of the braille actuator.

FIG. 10 is a view for explaining an installation environment of the braille actuator. Referring to FIG. 10, the braille learning apparatus according to a preferred embodiment of the present invention may further include a base A610, a cover A620, and a driver circuit A630 along with the aforementioned braille actuators.

The base A610 is provided with a plurality of cells A612 each having one braille actuator installed according to a preferred embodiment of the present invention, and each of the cells A612 is provided with one actuator.

A braille groove A622 is formed on the cover A620 so that the braille projection A200 can protrude therefrom. The cover A620 is coupled with the base A610 to prevent the braille actuators from falling out externally.

The driver circuit A630 supplies current to the electromagnet A400 of the braille actuators each provided in one of the plurality of cells A612 in accordance with the information to be output to the user to control the braille actuator installed in each cell A612. The driver circuit A630 may be installed inside the base portion A610 and supply current to the electromagnet A400 of each braille actuator under the control of the control unit described above.

Meanwhile, the braille learning apparatus according to the embodiment of the present invention may further include a key input unit for receiving user commands for mode selection, confirmation selection, and volume control. The braille learning apparatus may further include a battery remainder display unit for displaying a remaining battery amount of the battery unit, and a charging terminal connected to an external terminal for supplying a charging power source to the battery unit.

Figure 11:
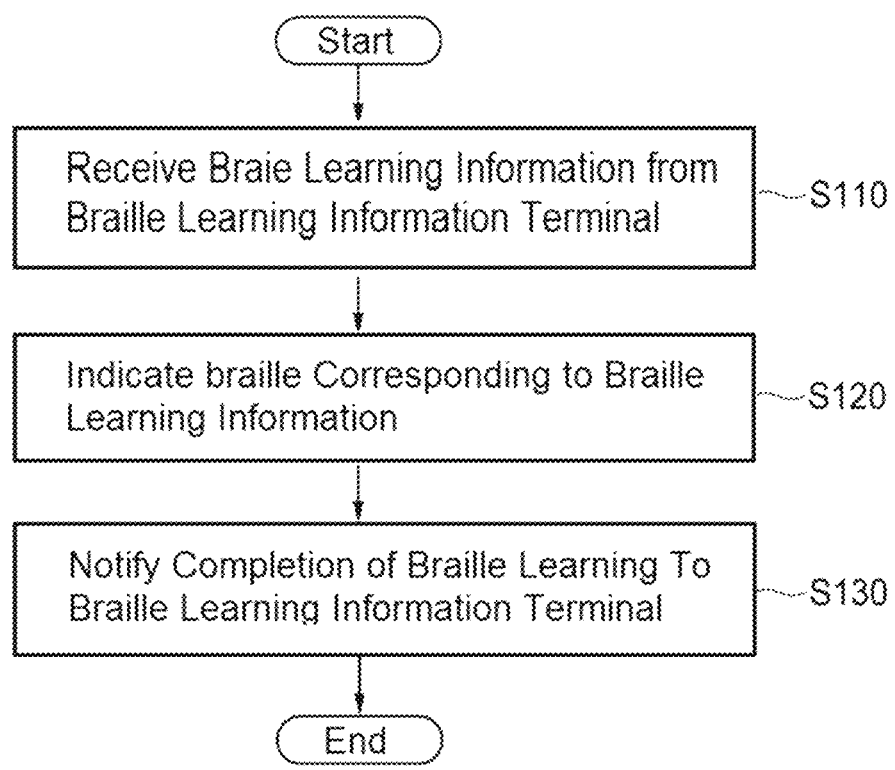
FIG. 11 is a diagram for explaining a braille learning method according to an embodiment of the present invention.

FIG. 11 is a diagram for explaining a braille learning method according to the embodiment of the present invention.

Referring to FIG. 11, a braille learning method performed by the braille learning apparatus according to the embodiment of the present invention will be described.

Since the functions performed in the braille learning method shown in FIG. 11 are all performed by the braille learning apparatus described with reference to FIG. 1 to FIG. 10, even if no explicit explanation is given, it should be noted that all the functions described above are performed in the braille learning method according to the preferred embodiment of the present invention, and all the functions described with reference to FIG. 11 are performed by the braille learning apparatus according to the preferred embodiment of the present invention.

First, when a learning word is input from the educator to the braille learning information terminal, the braille learning information including the learning word is transmitted from the braille learning information terminal and the braille learning information is received by the communication unit of the master station (S110).

Next, the control unit of the master station converts the learning word corresponding to the braille learning information received by the communication unit into braille, and controls the braille actuator to indicate the converted braille (S120).

At this time, under the control of the controller, the braille actuator supplies current to the electromagnet of the braille actuator, so that the braille protrusions corresponding to the converted braille are raised to indicate the braille.

Next, after the learner reads the braille and inputs the completion of the learning of the braille through the user input, the control unit of the master station transmits a signal notifying the completion of the learning to the braille learning information terminal through the communication unit (S130).

After the operation 130 is completed, the operation 110 may be repeated from the operation 110.

Figure 12:
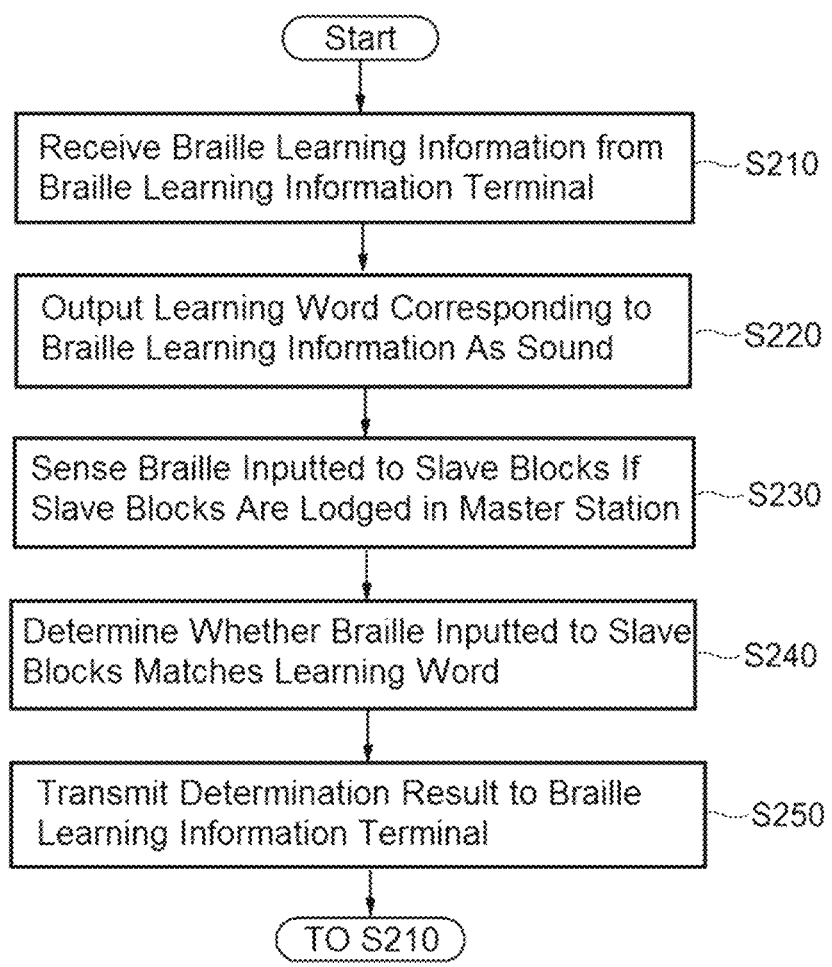
FIG. 12 is a diagram for explaining a braille learning method according to another embodiment of the present invention.

FIG. 12 is a diagram for explaining a braille learning method according to another embodiment of the present invention.

Referring to FIG. 12, a braille learning method performed by the braille learning apparatus according to an embodiment of the present invention will be described.

However, since the functions performed in the braille learning method shown in FIG. 12 are all performed by the braille learning apparatus described with reference to FIG. 1 to FIG. 10, even if no explicit description is given, it should be noted that all the functions described above are performed in the braille learning method according to the preferred embodiment of the present invention, and all the functions described with reference to FIG. 12 are performed by the braille learning apparatus according to the preferred embodiment of the present invention.

First, when the learner dislodges the slave blocks from the master station and the educator inputs a learning word to the braille learning information terminal, the braille learning information including the learning word is transmitted from the braille learning information terminal, which is then received by the communication unit of the master station (S210).

Next, the control unit of the master station controls the sound output unit to output a learning word corresponding to the braille learning information (S220).

However, it should be noted that step 220 may not be performed separately according to the needs of the user. That is, in case where the educator who guides the braille learning can pronounce the learning word by voice, step 230, which will be described later, may be performed immediately without outputting sound through the sound output unit.

Then, if the learner inputs the braille corresponding to the learning word into the slave blocks and then mounts the slave blocks in the block station of the master station, the sensing unit of the master station senses the braille inputted to the slave blocks (S230).

At this time, the sensing unit is turned on by the braille inputted to the slave blocks, and the control unit of the master station can check the braille inputted to the slave blocks depending on whether the sensing unit is turned on.

Then, the control unit determines whether or not the braille inputted to the slave blocks and the learning word corresponding to the braille learning information match each other (S240), and the determination result is transmitted to braille learning information terminal through the communication unit (S250).

In other words, the educator can immediately check whether or not the learner has inputted the correct braille corresponding to the learning word, and also can check whether or not the braille is entered incorrectly.

Further, after the operation up to operation 250, the operation may be repeated from operation 210 described above.

Figure 13:
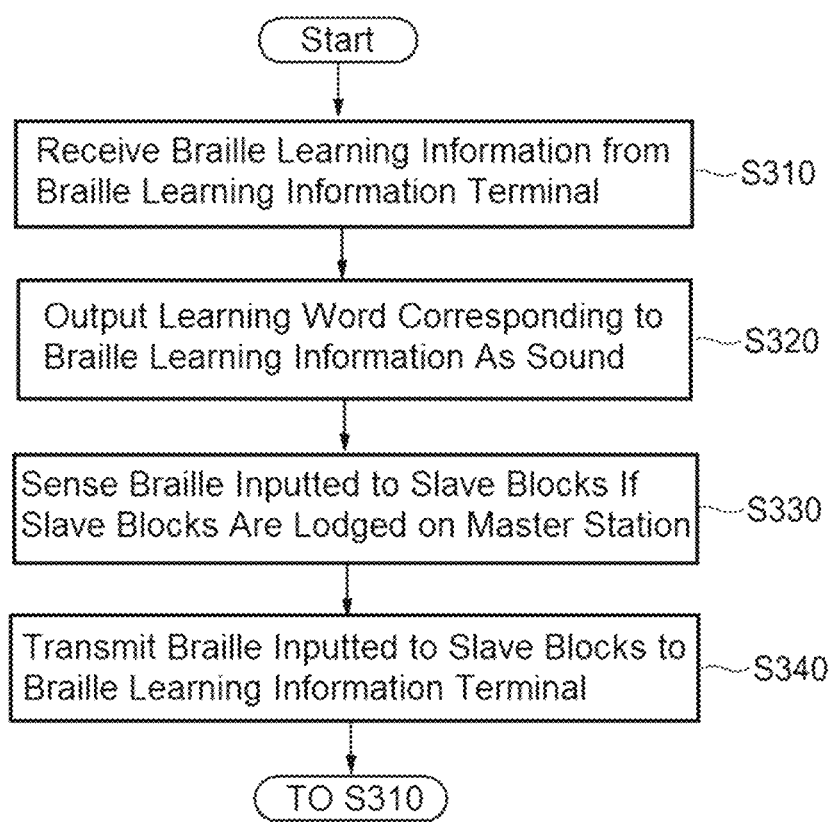
FIG. 13 is a diagram for explaining a braille learning method according to another embodiment of the present invention.

FIG. 13 is a diagram for explaining a braille learning method according to another embodiment of the present invention.

Referring to FIG. 13, a braille learning method performed by the braille learning apparatus according to another embodiment of the present invention will be described.

Here, the braille learning apparatus according to another embodiment of the present invention can be configured substantially the same as the braille learning apparatus described with reference to FIGS. 1 to 10. However, the braille learning apparatus according to another embodiment of the present invention differs from the braille learning apparatus in that the braille learning apparatus is configured to directly transmit information on the braille inputted to the slave blocks to the braille learning information terminal.

First, when a learner dislodges the slave blocks from the master station and the educator inputs a learning word into the braille learning information terminal, the braille learning information including the learning word is transmitted from the braille learning information terminal, which is then received by the communication unit of the master station (S310).

Next, the control unit of the master station controls the sound output unit to output a learning word corresponding to the braille learning information (S320).

However, it should be noted that step 320 may not be performed separately according to the needs of the user. That is, if the educator who guides the braille learning can pronounce the learning word by voice, step 330, which will be described later, may be performed immediately without outputting sound through the sound output unit.

Then, if the learner inputs the braille corresponding to the learning word into the slave blocks and then mounts the slave blocks in the block station of the master station, the sensing unit of the master station senses the braille inputted into the slave blocks (S330).

At this time, the sensing unit is turned on by the braille inputted to the slave blocks, and the control unit of the master station can confirm the braille inputted to the slave blocks depending on whether the sensing unit is turned on.

Next, under the control of the control unit, the communication unit transmits information on braille inputted to the slave blocks to the braille learning information terminal (S340).

The information transmitted to the braille learning information terminal may include information on the braille itself inputted to the slave blocks, or may include information obtained by converting the braille inputted to the slave blocks into a word or a sentence.

Accordingly, the educator can immediately check whether or not the learner has inputted the correct braille corresponding to the learning word, and can also confirm which braille is entered incorrectly. In addition, after the step 340 has been completed, the above-described step 310 may be repeated from step 310 again.

While the present invention has been particularly shown and described with reference to exemplary embodiments thereof, it is to be understood that the invention is not limited to the disclosed embodiments, but, on the contrary, is intended to cover various modifications and equivalent arrangements included within the spirit and scope of the appended claims.

What is claimed is:

1. A braille learning apparatus, comprising: a plurality of slave blocks for receiving braille from a learner; and
   a master station configured to:
   receive braille learning information from an external braille learning information terminal, when the plurality of slave blocks corresponding to a specific braille inputted by the learner are mounted on the master station, determine whether the specific braille inputted to the plurality of slave blocks match a learning word, wherein each of the plurality of slave blocks comprises:
   a block body having a plurality of through holes provided on a front surface and a rear surface thereof, which are opposite to each other; and
   a plurality of braille input pins accommodated in the block body, each of the plurality of braille input pins being configured to be pressed by an external force of the learner, wherein one end of each of the plurality of braille input pins are configured to protrude via a through hole at the front surface of the block body when the braille is not inputted, and another end of each of the plurality of braille input pins are configured to protrude via a through hole at the rear surface of the block body when the braille is inputted,
   and
   transmit a determination result to the external braille learning information terminal.

2. The apparatus of claim 1, wherein each of the plurality of slave blocks further includes:
   a braille input pin fixing member for fixing a braille input state or an uninput state so as not to change until the external force of the learner is applied to each of the braille input pins.

3. The apparatus of claim 2, wherein the braille input pin fixing member comprises:
   a permanent magnet fixedly coupled to a predetermined position of the braille input pin; and
   a pair of magnetic bodies spaced apart from each other by a predetermined distance so that the permanent magnet can move inside the block body.

4. The apparatus of claim 1, wherein the master station comprises:
   a block mount unit for providing a predetermined space in which the plurality of slave blocks are mounted; and
   a sensing unit which is turned on by pressing a braille input pin protruding from a-the rear surface of each of the plurality of slave blocks when the plurality of slave blocks are mounted on the block mounting unit.

5. The apparatus of claim 4, wherein the master station further comprises:
   a block fixing unit for applying a predetermined attractive force when the plurality of slave blocks are mounted on the block mounting unit to firmly fix the plurality of slave blocks.

6. The apparatus of claim 4, wherein the master station further comprises:
   a communication unit for communicating with the external braille learning information terminal and receiving the braille learning information; and
   a controller for checking the braille inputted to the plurality of slave blocks based on whether the sensing unit is turned on and controlling the driving of the master station.

7. The apparatus of claim 6, wherein the communication unit transmits the braille inputted to the slave blocks to the braille learning information terminal under the control of the controller, or compares the braille inputted to the plurality of slave blocks with the learning word corresponding to the braille learning information by the controller, and transmits the determination result based on the comparison to the braille learning information terminal.

8. The apparatus of claim 1, wherein the master station further comprises an acoustic output unit for outputting a learning word corresponding to the braille learning information to a sound.

9. The apparatus of claim 1, wherein the master station further comprises a braille actuator for indicating the learning word corresponding to the braille learning information in braille.

10. The apparatus of claim 9, wherein the braille actuator comprises:
    an electromagnet provided on a lower surface and whose polarity changes according to a current flow;
    a rotary member having an inclined upper surface, a permanent magnet provided on a lower surface thereof, and rotated by an attractive force or a repulsive force acting on the electromagnet; and
    a braille protrusion formed as an inclined surface such that a bottom surface thereof contacts the inclined surface of the rotary member, and is raised or lowered along the inclined surface of the rotary member when the rotary member is rotated.

* * * * *